June 11, 1968   M. H. GROVE   3,387,632
METER PROVER AND DIVERTER VALVE THEREFOR
Filed April 8, 1966   3 Sheets-Sheet 1
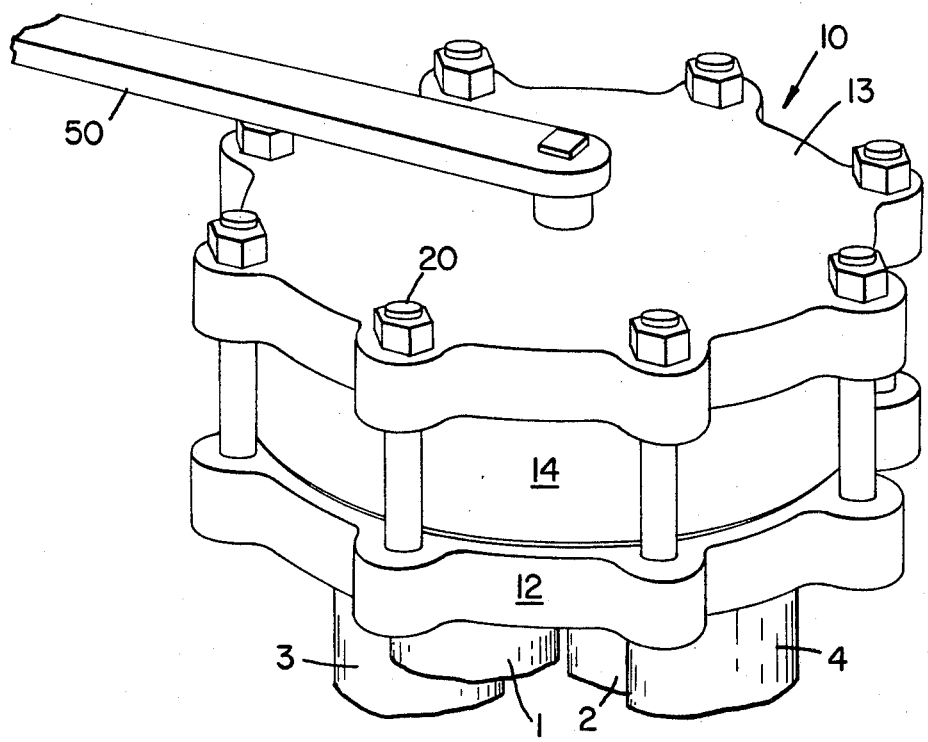
FIG_1
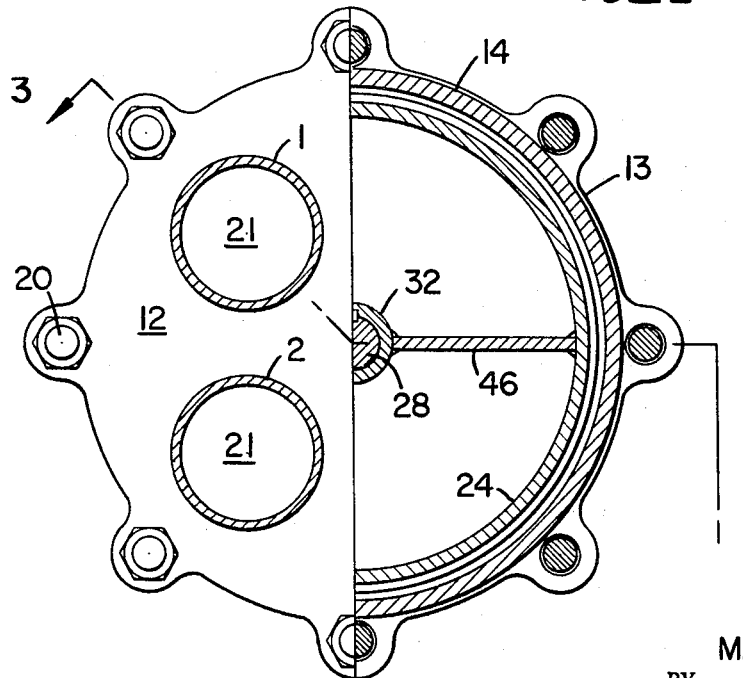
FIG_2
INVENTOR.
MARVIN H. GROVE
BY
ATTORNEYS

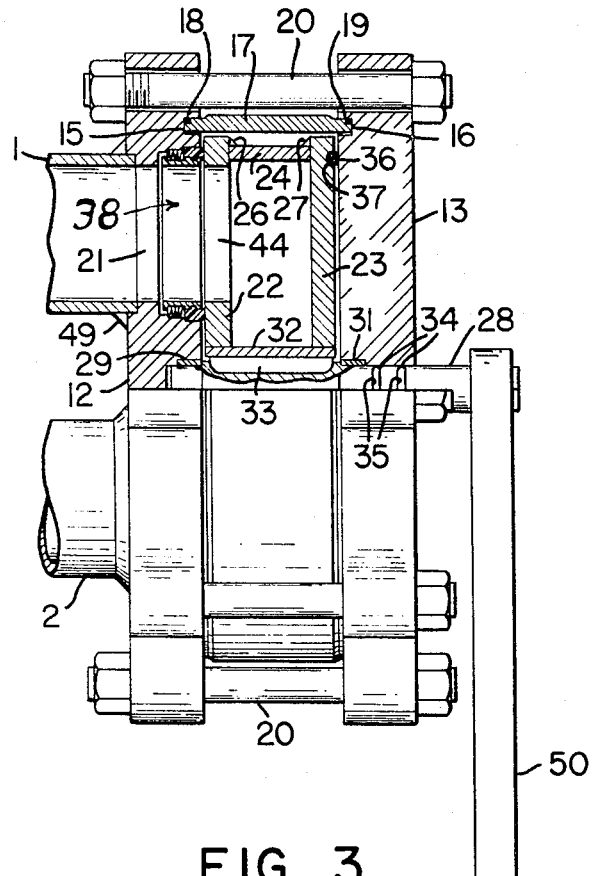
FIG_3
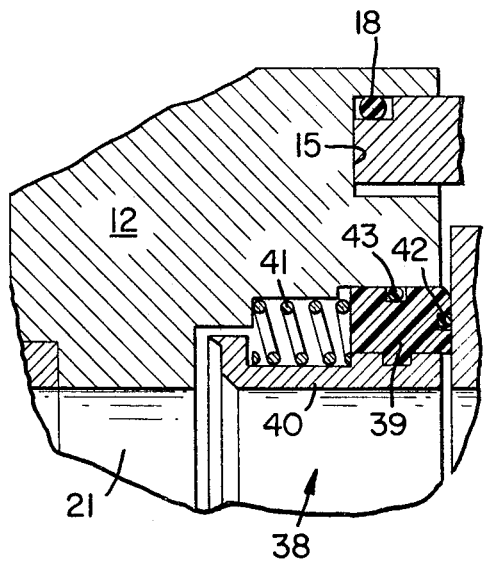
FIG_5
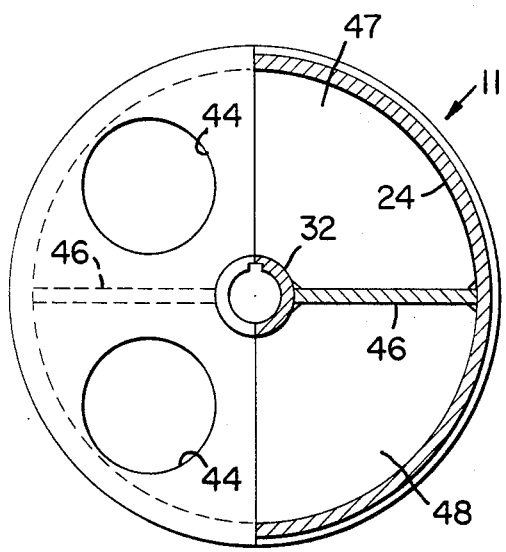
FIG_4
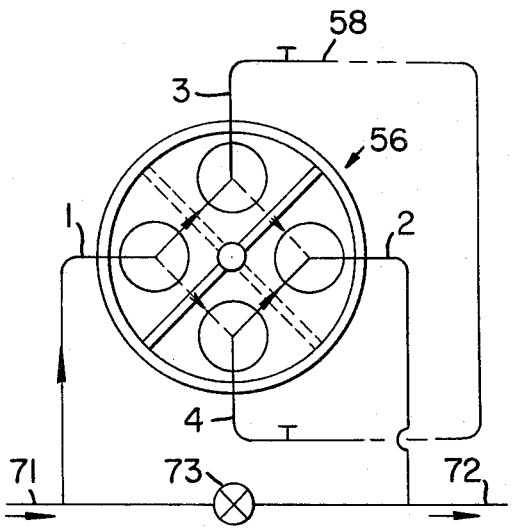
FIG_6
INVENTOR.
MARVIN H. GROVE
BY
ATTORNEYS June 11, 1968     M. H. GROVE     3,387,632
METER PROVER AND DIVERTER VALVE THEREFOR
Filed April 8, 1966     3 Sheets-Sheet 3
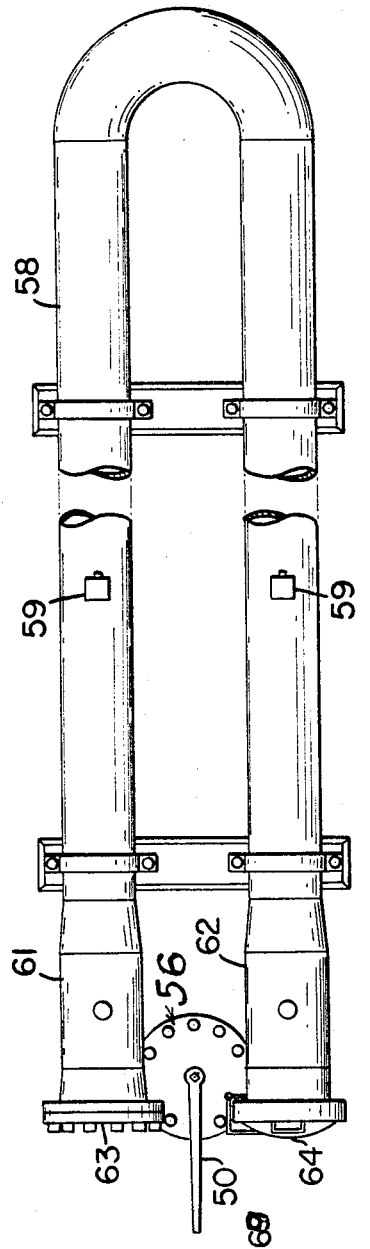
FIG_7
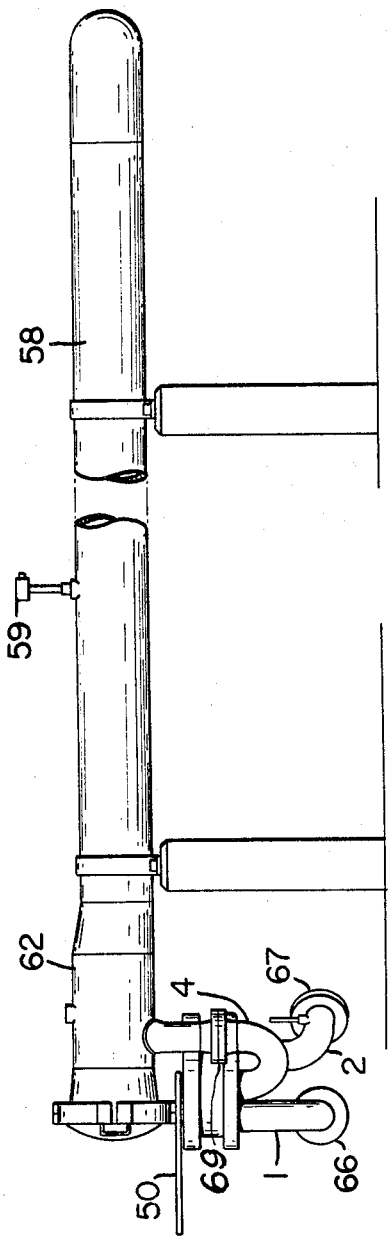
FIG_8
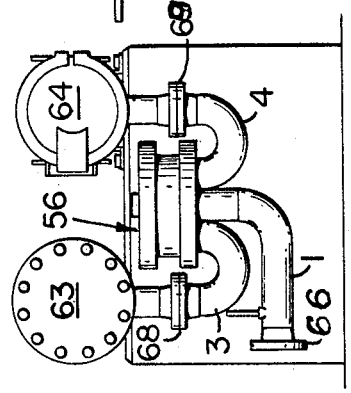
FIG_9
INVENTOR.
MARVIN H. GROVE
BY
ATTORNEYS

United States Patent Office 3,387,632
Patented June 11, 1968

3,387,632
METER PROVER AND DIVERTER
VALVE THEREFOR
Marvin H. Grove, Piedmont, Calif., assignor to M & J
Valve Company, Houston, Tex., a corporation of
Delaware
Filed Apr. 8, 1966, Ser. No. 541,269
5 Claims. (Cl. 137—625.43)

This invention relates generally to meter proving apparatus of the bidirectional type such as are employed in conjunction with pipe line transmission systems. It also relates to diverter valves for use in such systems.

In connection with pipe line systems for conveying various liquid petroleum products, it is important to provide accurate flow metering means. The more conventional flow metering devices, such as meters of the positive displacement and turbine types, are subject to serious inaccuracies that may be cumulative. Of recent years, so-called meter provers have been employed which make accurate periodic checks of the flow for calibration of the flow meter. One form of meter prover which has been developed is disclosed in Patent 2,772,561, and employs an extended length of calibrated metering pipe of uniform internal diameter which is connected into the main piping system. An interchange connects between the inlet and discharge ends of the metering pipe and is valve controlled to enable a sphere or plug to be launched from the interchange into the inlet end of the metering pipe and to be returned to the interchange after it reaches the discharge. By means of an associated electrical system which is activated when the sphere passes through detecting points near the inlet and discharge ends, a flow meter reading is obtained for the time required for the travel of the sphere between the detecting points. This reading is then compared with the known volume of the metering pipe between the detecting points to provide accurate calibration data.

Meter provers as described above are of the unidirectional type. In other words, the sphere or plug is always caused to move in one direction. Another type of meter prover which is used is of the bidirectional type. The metering pipe in this instance has its end portions connected to the transmission line through diverter valve means, whereby flow takes place through the metering line in alternate directions. The valves used in such bidirectional apparatus have been unsatisfactory for several reasons. Particularly, such valves have been subject to leakage due in part to the use of ineffective sealing arrangements, and also due to the tendency of foreign material to collect within the valve bodies, with resulting injury to the valve working surfaces and sealing means employed. In some instances it has been proposed to use a plurality of valves to serve as diverter valve means, with the result that installation and maintenance costs are relatively high.

A further objectionable feature in valves such as have been used with bidirectional meter provers is that they require relatively high forces for their operation. This makes manual operation difficult, particularly if a plurality of valves are connected to a common operating member.

In general, it is an object of the present invention to provide an improved meter prover of the bidirectional type which is characterized by the use of a simple and effective diverter valve.

Another object of the invention is to provide a meter prover of the bidirectional type which is relatively immune with respect to deposit of objectionable foreign material in the diverter valve.

Another object of the invention is to provide a novel diverter valve for use with meter provers of the bidirectional type, the valve being characterized by a simple construction which is adapted for making connection with associated piping through one flat end wall of the valve body.

Another object of the invention is to provide a diverter valve for bidirectional meter provers which is relatively simple and easy to operate, and which serves to control flow of fluid through a bidirectional calibrated loop by movement of an operating member through an arc of 90°.

Additional objects and features of the invention will appear from the following description in which the preferred embodiment has been set forth in detail in conjunction with the accompanying drawing.

Referring to the drawing:

FIGURE 1 is a perspective view illustrating a diverter valve incorporating the present invention;

FIGURE 2 is a view looking toward the bottom end of the valve shown in FIGURE 1, one-half of the view being in section;

FIGURE 3 is a cross-sectional view taken along the line 3—3 of FIGURE 2;

FIGURE 4 is an end view of the rotatable valve member, one-half of the view being in section;

FIGURE 5 is a cross-sectional detail showing the sealing means;

FIGURE 6 is a schematic view illustrating connections between the valve of FIGURES 1-4 and piping representing a bidirectional meter prover installation;

FIGURE 7 is a plan view of a meter prover incorporating the four-way valve of FIGURES 1-4;

FIGURE 8 is a side elevational view of the meter prover shown in FIGURE 7; and

FIGURE 9 is an end view of the meter prover shown in FIGURES 7 and 8.

The diverter valve shown in FIGURES 1-4 consists of a body 10 and the inner rotatable valve member 11. The body is fabricated of suitable material such as mill steel, and consists of the flat first and second end walls 12 and 13, and the intermediate cylindrical shaped part 14. The end walls can be burned by a cutting torch from steel plate of suitable thickness. The intermediate part 14 can be cut from a piece of pipe of suitable wall thickness, or it may be formed by rolling a strip of steel suitable thickness to cylindrical form and welding together the ends. As shown in FIGURE 3, the end walls 12 and 13 are machined to provide the annular grooves 15 and 16 which accommodate the machined end portions of the intermediate part 14. Suitable sealing means such as resilient O-rings 18 and 19 form seals between the end walls and the intermediate part 14. Suitable means such as bolts 20 serve to clamp the end walls against the intermediate body part.

The first end wall 12 is provided with a plurality of openings 21 which form flow passages. In this particular embodiment, there are four such openings, and they are at equal radial distances from the center of the body, and they are equally spaced circumferentially.

The valve member 11 consists of relatively flat first and second end walls 22 and 23, together with the substantially cylindrical intermediate part 24. The ends of the intermediate part 24 are secured to the end members 22 and 23 by suitable circular welds 26 and 27. An operating shaft 28 is disposed centrally and is journalled in both end walls 12 and 13 by the journal bushings 29 and 31. The valve member has a central sleeve or hub 32 which accommodates the shaft, and which extends through the end walls 22 and 23 and is secured thereto as by welding. The hub 32 is non-rotatable with respect to the shaft by virtue of the key 33.

It will be noted that there is some clearance between the exterior faces of the end walls 22 and 23 of the valve member and the adjacent inner surfaces of the body end walls 12 and 13. Normally this clearance is maintained during operation of the valve. Means is provided to form a fluid-tight seal between the saft 28 and the end wall 13. The sealing means illustrated consists of seal rings 34 of the resilient O-ring type accommodated in grooves 35 provided in the shaft.

It is desirable to provide means interposed between the walls 13 and 23 to take the thrust of the valve member toward the wall 13. Preferably this consists of a ring 36 made of relatively hard resilient material such as nylon, or a suitable synthetic rubber. It is accommodated within the circular recess 37 formed in the wall 23. The diameter of the resilient member 36 is only slightly less than the over-all diameter of the valve member.

The end member 12 of the body is machined to carry a plurality of sealing assemblies 38, there being one assembly for each of the openings 21. The particular assembly illustrated is of the type disclosed and claimed in my copending application S.N. 453,403, filed May 5, 1965. Each assembly consists of a sleeve-like seal ring 39 made of suitable resilient material like nylon, which is mounted upon the metal carrier ring 40. A plurality of compression springs 41 serve to urge the seal ring 39 against the adjacent valve working surface of the wall 22. The end of the nylon ring 39 which contacts the wall 22 is shown provided with an insert 42 of relatively softer resilient material, such as a suitable synthetic rubber or elastomer. A seal ring 43 of the resilient O-ring type establishes a seal between the nylon ring 39 and the adjacent surface of the body wall 12. Because of the difference between the diameter of seal 43 and insert 42, the seal ring 39 presents a fluid pressure area to any differential pressure existing between an opening 21 and the body space.

The valve member end wall 22 is provided with a plurality of ports 44 which have the same general location and distribution as the openings 21, whereby the valve member can be positioned to cause each of the ports 44 to register with a corresponding one of the openings 21.

Within the interior of the valve member there is a barrier formed by the two walls 46 which extend radially between the hub 32 and the cylindrical part 24. The ends of each wall 46 are secured as by welding to the hub 32 and to the wall 24, and the side edges are likewise secured by welding to the adjacent portions of the end walls 22, 23. The barrier formed by the walls 46 serves to divide the interior of the valve member into two spaces or flow paths 47 and 48, each of which is in communication with two adjacent port openings 44.

Pipes 1, 2, 3 and 4 are shown making connections with the openings 21 of the valve body. These pipes are secured to the body by suitable means such as welds 49.

A suitable hand lever 50 is shown secured to the exterior end of the shaft 28 whereby the shaft and the valve member may be rotated manually between operating positions.

FIGURES 7-9 illustrate a bidirectional meter prover using a diverter valve 56 as described above. The calibrated pipe 58 is in the form of a loop made of pipe of predetermined inside diameter through which a sphere may pass in either direction. Suitable electrical sphere detectors 59 are provided near the ends of the loop to give the necessary electrical signal when the sphere passes into or leaves the loop. The head portions 61 and 62 of enlarged internal diameter connect with the ends of the loop.

Header 61 is provided with the bolted-on closure 63, and header 62 is provided with the readily removable hinged closure 64 through which a sphere may be introduced or removed. The pipes 1, 2, 3 and 4 which make connection with the diverter valve are in the form of bends for connection with other parts of the meter prover system. Thus the pipes 1 and 2 terminate in coupling flanges 66 and 67 which connect with upstream and downstream piping. Pipes 3 and 4 terminate in couplings 68 and 69 which make connection with the headers 71 and 72.

The connections described above are shown schematically in FIGURE 6. Line 71 represents the upstream part of a pipe system, and line 72 the downstream side. These parts of the line represent the upstream and downstream sides of the valve 73. The diverter valve 56 is shown with its pipe connections as previously described. The two operating positions of the diverter valve are illustrated schematically in solid and dotted lines, and represent turning of the valve member through 90°. For the position illustrated in solid lines, it is evident that lines 1 and 3 are placed in direct communication, and likewise lines 4 and 2 are placed in communication. For the other position illustrated in dotted lines, lines 1 and 4 are placed in communication, and likewise lines 3 and 2 are in communication. Thus by turning the lever 50 through 90°, the direction of liquid flow through loop 58 may be reversed.

Previous reference has been made to the fact that pipes 1, 2, 3 and 4 all connect to one end wall of the valve. This greatly simplifies assembly with other parts of the meter prover and makes for a simplified piping layout. Another feature is the fact that all the pipes 1, 2, 3 and 4 extend downwardly from the valve body. This tends to avoid settling out of solid material in the valve body, thus preventing damage that might otherwise occur due to abrasion of the seal rings and valve working surfaces.

The diverter valve itself is relatively simple in construction. All of the valve working surfaces are on a common plane. The body and valve member are fabricated of mill steel, instead of castings as with prior valves having more than two port openings.

I claim:

1. In a multiport valve construction, a valve body comprising parallel first and second substantially flat end walls and a substantially cylindrical part interposed between and sealed with respect to the end walls, at least four circumferentially spaced openings in the first end wall of the body for making connection with associated piping, a valve member rotatably disposed within the valve body, said valve member comprising parallel flat first and second circular end walls and a cylindrical part secured at its ends to the peripheral edges of the end walls, the diameter of the cylindrical part of the valve member being less than the internal diameter of the cylindrical part of the body, the exterior surfaces of the first and second end walls of the valve member being in spaced juxtaposition with the interior faces of the first and second end walls of the body, at least four circumferentially spaced port openings in the first wall of the valve member and adapted to register with the openings in the first end wall of the valve body, shaft means serving to rotatably mount the valve member within the valve body for rotation about the central axis of the valve member, sealing means disposed to surround each of the openings in the first end wall of the valve body, each of said sealing means serving to establish sealing relation between the valve body and the adjacent first end wall of the valve member, and barrier means fixed within the valve member and extending across the interior of the same, said barrier forming two separate flow paths, each path being in communication with two adjacent ones of the ports in the valve member.

2. A valve as in claim 1 in which each of said sealing means comprises an annular assembly, each assembly being carried by the first end wall of the valve body and being in fluid-tight communication with the adjacent exterior face of the first end wall of the valve member.

3. A valve construction as in claim 2 in which each of said sealing assemblies includes a ring of non-metallic resilient material and spring means for urging said ring into fluid-tight sealing contact with the adjacent exterior face of the first end wall of the valve member.

4. A valve as in claim 1 together with means disposed between the second end wall of the valve member and the second end wall of the valve body, said means comprising a groove formed in one of said end walls, the ring of resilient nonmetallic material accommodated within said groove, said resilient ring serving to form a thrust bearing between the two said end walls.

5. A valve as in claim 4 in which the diameter of said ring is slightly less than the diameter of the valve member.

References Cited

UNITED STATES PATENTS 2,519,574   8/1950   Holl _____ 137—625.43

FOREIGN PATENTS 481,685   3/1938   Great Britain.
31,658   10/1961   Finland.

M. CARY NELSON, *Primary Examiner.*

J. DWELLE, *Assistant Examiner.*